United States Patent
Tozuka

[19]

[11] Patent Number: 6,067,302
[45] Date of Patent: May 23, 2000

[54] MULTIPLEX COMMUNICATION APPARATUS FOR USE IN MOTOR VEHICLE

[75] Inventor: Akira Tozuka, Miyagi-ken, Japan

[73] Assignee: Alps Electric Co., Ltd., Japan

[21] Appl. No.: 08/887,925

[22] Filed: Jul. 3, 1997

[30] Foreign Application Priority Data

Jul. 16, 1996 [JP] Japan ................................. 8-186437

[51] Int. Cl.⁷ .............................. H04J 15/00; H02G 3/00
[52] U.S. Cl. .......................................... 370/464; 307/10.1
[58] Field of Search ..................... 370/451, 461, 370/489, 502, 466, 467, 469, 471, 212; 340/825.06, 825.07; 307/10.1

[56] References Cited

U.S. PATENT DOCUMENTS

| | | | |
|---|---|---|---|
| 4,792,783 | 12/1988 | Burgess et al. | 307/10.1 |
| 4,942,571 | 7/1990 | Moller | 370/425 |
| 5,408,471 | 4/1995 | Nobutoki | 370/431 |
| 5,483,230 | 1/1996 | Mueller | 370/364 |
| 5,555,502 | 9/1996 | Opel | 364/424.05 |
| 5,579,299 | 11/1996 | Halter et al. | 370/451 |
| 5,592,485 | 1/1997 | Consiglieri et al. | 370/360 |
| 5,798,575 | 8/1998 | O'Farrell et al. | 307/10.1 |

FOREIGN PATENT DOCUMENTS

| | | |
|---|---|---|
| 2073845 | 2/1993 | Canada . |
| 5-221322 | 8/1993 | Japan . |

*Primary Examiner*—Chi H. Pham
*Assistant Examiner*—Steven Nguyen
*Attorney, Agent, or Firm*—Brinks Hofer Gilson & Lione

[57] ABSTRACT

A vehicle multiplex communication apparatus having such a transmission arrangement that the rate of transmission of information over a common bus is limited to a prescribed rate without limiting the number of additional control elements provided in a vehicle. The communication apparatus has the common bus provided in the vehicle and a plurality of central control units connected to the common bus. The central control units transmit information in accordance with a first information protocol between the common bus and constitutional controlled equipment of the vehicle or control elements for controlling the controlled equipment. The communication apparatus also has an information collection control unit connected to at least one of the plurality of central control units through a simpler bus. The information collection control unit transmits information in accordance with a second information protocol different from the first information protocol between the simpler bus and at least one additional control element provided as desired.

5 Claims, 3 Drawing Sheets

MULTIPLEX COMMUNICATION APPARATUS FOR USE IN MOTOR VEHICLE

BACKGROUND OF THE INVENTION

1. Field of the Invention

The present invention relates to a multiplex communication apparatus for use in a motor vehicle and, more particularly, to a vehicle multiplex communication apparatus which transmits, in accordance with a desired information protocol, each of various control information items and detection information items from control elements and controlled devices via a common bus line provided in a motor vehicle.

2. Description of the Related Art

Motor vehicles having, on the steering wheel or steering column, one or more switches for operating and controlling various mechanisms or devices have been provided. A driver can operate controlled mechanisms or devices provided in a motor vehicle by operating such switches while driving the vehicle. The controlled mechanisms and the operating switches are connected to a plurality of central control units, and information is transmitted over a bus line between the central control units. When some of the operating switches, attached to the steering wheel, for example, are operated by the driver, operation signals indicating the operated states of the switches are collectively supplied to the central control unit also provided on the steering wheel. The collected operation signals are transmitted from the central control unit on the steering wheel to one or more central control units provided on the vehicle body side via a common bus line connected to the central control units. The central control units receiving the operation signals execute the desired operations of controlling the corresponding controlled units according to the sorts and contents of the operation signals. For example, Japanese Patent Laid-Open Publication No. 221322/1993 discloses a vehicle multiplex communication apparatus for performing such control.

The vehicle multiplex communication apparatus disclosed in Japanese Patent Laid-Open Publication No. 221322/1993 has an electrical and mechanical rotary transmission device, a first interface module (central control unit) provided on the steering wheel of a motor vehicle, connected to a plurality of operating switches and controlled with a micro-controller, a second interface module (central control unit) provided on the vehicle body side and controlled with a micro-controller, and a bus line which connects the first and second interface modules. Communication information in the code for the CAN-BUS system is exchanged continuously between the steering wheel side and the vehicle body side in a bidirectional transmission manner.

In general, users select motor vehicles according to their various needs and preferences. Therefore, vehicle operating equipment, accessories and the like as well as a variety of vehicle types are designed so as to largely reflect user's needs and preferences. Also, it is a rather ordinary practice to mount various kinds of equipment or accessories on a motor vehicle or to change already-mounted equipment or accessories at the time of or after delivery of the vehicle to a user according to user's needs or preferences, as well as to manufacture motor vehicles in accordance with various specifications at the production stage. In such a situation, equipment on the steering wheels of motor vehicles is such that an air bag system separately provided is attached at the time of or after delivery to a user, and various operating switches for controlling vehicle equipment are also attached according to user's needs or preferences.

The vehicle multiplex communication apparatus disclosed in Japanese Patent Laid-Open Publication No. 221322/1993 and other known vehicle communication apparatuses of the same kind entail the problem of the number of operating switches (additional control elements) attachable around a steering wheel being limited according to the number of input terminals of the connected interface modules (central control units) and the switching control capacity of the interface modules.

Ordinarily, for multiplex communication in motor vehicles, a bus system having a high transmission capacity, for example, the above-mentioned CAN-BUS is used in order to transmit signals at a high rate. In such a system, however, a central processing unit (CPU) forming a central control unit is necessarily large in scale and high-priced since it processes many signals. Also, if a multiplicity of input devices and switching control units corresponding to the number of switching terminals of the input devices are prepared for adaptation of a multiplicity of operating switches as described above, the manufacturing cost of the apparatus is further increased.

In vehicle multiplex communication, a number of central control units, i.e., CPUs, are employed. If a plurality of different CPUs are prepared in accordance with required functions, the manufacturing cost of the communication apparatus becomes considerably high and the parts management becomes complicated. For this and other reasons, a CPU most excellent in functions is ordinarily used in a shared fashion. Inevitably, such a CPU has a high unit price.

An apparatus for checking the performance of the equipment using the CAN-BUS is large in scale and high-priced. However, it is necessary to use such an apparatus for checking the performance before the steering wheel and other parts are mounted, resulting in a considerable increase in facility investment.

There is still another problem of the vehicle multiplex communication apparatus disclosed in Japanese Patent Laid-Open Publication No. 221322/1993 and other known vehicle communication apparatuses of the same kind. If a multiplicity of operating switches (additional control elements) is mounted around a steering wheel according to user's needs or preferences, the number of signals is correspondingly increased and signals from the operating switches are transmitted over the common bus line simultaneously with ordinary control signals for controlling and operating some controlled units on the vehicle body side or with emergent control signals or the like for controlling the operation of the engine system. Under such a condition, there is a possibility of a delay of transmission of an emergent signal or the like, and, hence a delay of the operation of controlling a controlled unit in the engine or braking system.

SUMMARY OF THE INVENTION

In view of the above-described problems, an object of the present invention is to provide a vehicle multiplex communication apparatus using such a transmission arrangement that the rate of transmission of information over the common bus is limited to a predetermined rate without limiting the number of additional control elements.

To achieve the above-described object, a vehicle multiplex communication apparatus in accordance with the present invention is arranged so that constitutional controlled equipment of a vehicle and control elements for controlling the controlled equipment are collectively connected to central control units connected to each other through a common bus, and so that additional control elements optionally provided or changed as desired are collectively connected to an information collection control unit connected to the corresponding one of the central control units through a simpler bus. The communication apparatus also has a means for connecting the central control unit to the common bus line.

In the above-described multiplex communication apparatus, even if a multiplicity of control elements are provided in the vehicle, they are collectively connected to the information collection control unit, and switching information encoded into data in a simpler bus format is supplied to the corresponding central control unit via the simpler bus line. Therefore, the number of signals input to the central control unit and the number of input lines to the central control unit can be effectively reduced regardless of the number of additional control elements.

That is, according to one aspect of the present invention, there is provided a vehicle multiplex communication apparatus comprising a common bus line provided in a vehicle, a plurality of central control units connected to the common bus line, each of the central control units transmitting information in accordance with a first information protocol, and an information collection control unit connected to at least one of the central control units through a simpler bus line, the information collection control unit transmitting information in accordance with a second information protocol different from the first information protocol between the corresponding one of the central control units and at least one additional control element provided as desired.

According to another aspect of the present invention, the additional control element of the above-described vehicle multiplex communication apparatus comprises some of various operating switches disposed on a motor vehicle steering wheel.

According to still another aspect of the present invention, the additional control element of the above-described vehicle multiplex communication apparatus comprises an element for controlling some of various audio and video units provided on a motor vehicle instrument panel.

According to a further aspect of the present invention, in the above-described vehicle multiplex communication apparatus, the connection between the information collection control unit and the additional control element is such that the information collection control unit and the additional control element are detachably connected to each other.

In the vehicle multiplex communication apparatus thus arranged, an arbitrary number of additional control elements are provided in a motor vehicle and are collectively connected to the information collection control unit, and the information collection control unit is connected to the corresponding central control unit by the simpler bus. Therefore, even if the number of additional control elements is arbitrarily selected, the number of signal lines connected to the central control unit can be limited to a number sufficiently smaller than the number of additional control elements, thus avoiding limitation of the number of additional control elements by the capacity of the central control unit.

In the vehicle multiplex communication apparatus arranged as described above, even if the number of additional control elements is arbitrarily selected, additional information output from the additional control elements is entirely encoded into data in the simpler bus format in the information collection control unit before it is transmitted to the central control unit. Thus, the problem of a large number of additional information items being simultaneously transmitted over the common bus is solved, thereby preventing a delay of transmission of emergent control information over the common bus.

Further, the specifications of a number of CPUs each used as a central control unit can be simplified, so that the manufacturing cost of the apparatus can be reduced. Moreover, a simpler inspection apparatus can be used to check the performances of the component parts.

DESCRIPTION OF THE PREFERRED EMBODIMENT

An embodiment of the present invention will be described in detail with reference to the accompanying drawings.

Figure 1:
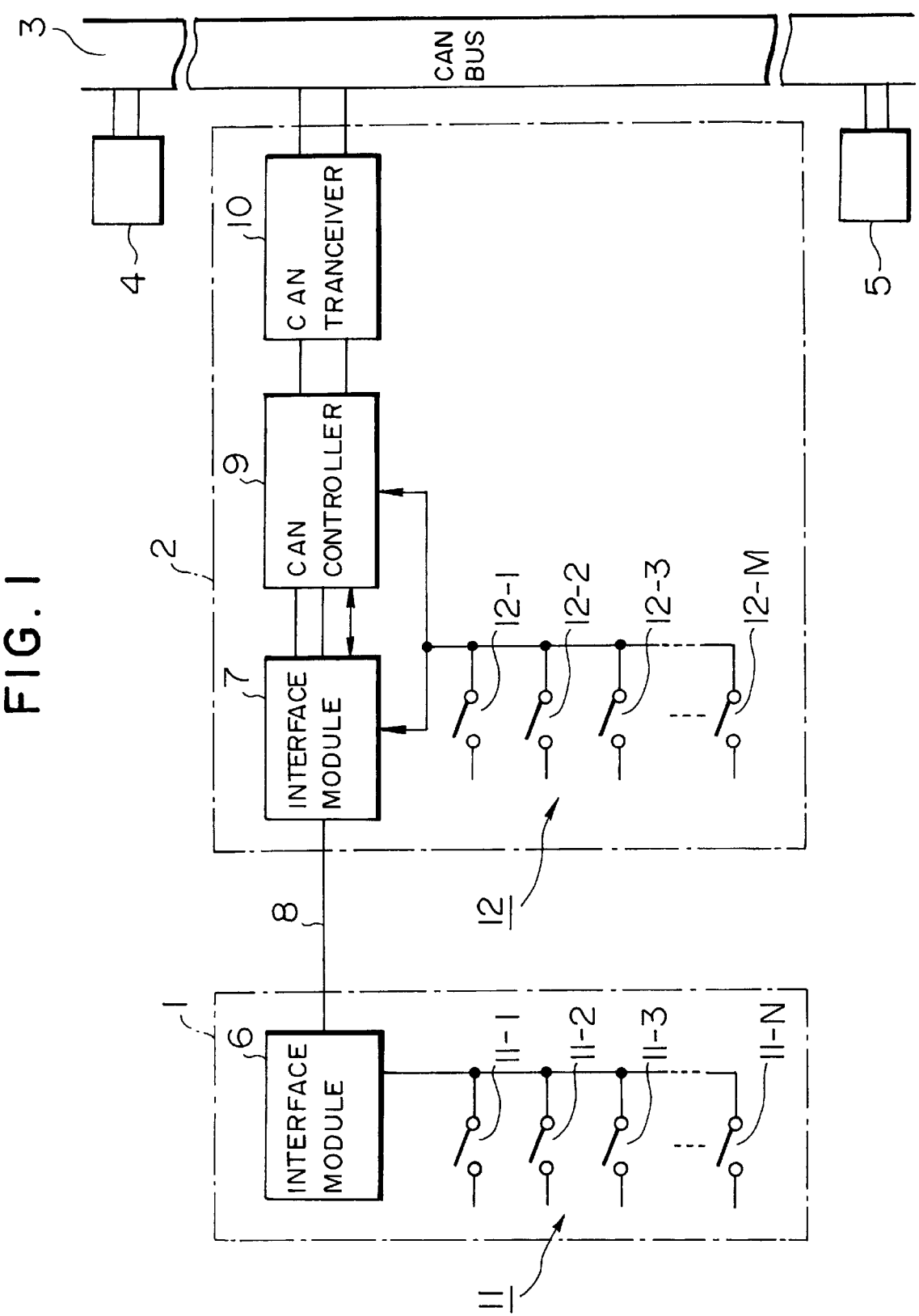
FIG. 1 is a block diagram of a vehicle multiplex communication apparatus which represents an embodiment of the present invention.

FIG. 1 is a block diagram schematically showing the configuration of a vehicle multiplex communication apparatus which represents an embodiment of the present invention.

As shown in FIG. 1, the vehicle multiplex communication apparatus is formed of an information collection control unit 1 disposed on a steering wheel of a motor vehicle, a central control unit 2 disposed in the vicinity of a steering column, a common bus line 3 provided in the motor vehicle and connected to the central control unit 2, second and third central control units 4 and 5 connected to the common bus line 3 along with the central control unit 2, and a simpler bus line 8 described below. The information collection control unit 1 has a first interface module 6 and an additional switch matrix 11. The central control unit 2 has a second interface module 7, a common bus (CAN-BUS) controller 9, a common bus (CAN-BUS) transceiver 10 and a constitutional switch matrix 12. Further, the simpler bus line 8 is connected between the first interface module 6 and the second interface module 7.

In the information collection control unit 1, the additional switch matrix 11 is formed of a combination of switches 11-1, 11-2, 11-3, . . . , 11-N related to vehicle equipment or accessories, e.g., audio equipment, a cruising mechanism, a car navigator apparatus and so on, which are optionally mounted according to user's needs or preferences. The switch matrix 11 is provided on a steering wheel pad or on a member disposed in the vicinity of the steering wheel pad. Each of the switches 11-1 to 11-N is connected to the first interface module 6. The first interface module 6 forms code data in accordance with a predetermined information protocol (a simpler bus system) from switch information indicating the operated states of the switches 11-1 to 11-N of the switch matrix 11, and sends out the data to the simpler bus line 8.

In the central control unit 2, the constitutional switch matrix 12 is formed of a combination of switches 12-1, 12-2, 12-3, . . . , 12-N related to constitutional controlled equipment of the motor vehicle, e.g., a wiper, a washer and a winker. Ordinarily, the constitutional switch matrix 12 is incorporated in a combination switch unit attached to the steering column. Each of the switches 12-1 to 12-N is connected to the second interface module 7 and to the common bus controller 9. The second interface module 7 converts switch information indicating the operated states of the switches 12-1 to 12-N and the code data supplied via the simpler bus line 8 into data in accordance with an information protocol (a common bus system, preferably a CAN-BUS system) suitable for transmission via the common bus line 3, and supplies the converted data to the subsequent common bus controller 9. The common bus controller 9 controls the information supplied from the second interface module 7 with respect to the transmission timing and so on, forms an information sequence, and supplies this information sequence to the common bus transceiver 10. The common bus transceiver 10 sends out the information sequence from the common bus controller 9 to the common bus line 3 in the interfacing state.

In this embodiment, the CAN-BUS system is of a multi-master communication control type, includes a protocol enabling high-speed communication at 1 Mbps and is capable of diverse high-performance communication. The CAN-BUS system includes various codes as data formats, e.g., a recognition code and an error correcting code. Naturally, the interface module managing this bus has a processing sections adapted to such various codes and also has a number of functions corresponding to various operations, e.g., transmission confirmation and reception confirmation. The scale of the interface is correspondingly large.

On the other hand, the simpler bus system is of a master-slave communication type and has only a minimum number of codes, such as those using a start bit and a parity bit, other than the control data field. The simpler bus cyclically transmits bits in such communication codes. Therefore, a small-scale interface may suffice for the simpler bus.

For example, transmission of code data using the simpler bus is performed in accordance with the communication method using the bus format in the multiplex communication system in the patent application made as Japanese Patent Application No. 301613/1995 by the applicant of the present invention, i.e., the method of communication between arbitrary two node terminals (control units) using data modulated by variable pulse width modulation (VPWM). In this multiplex communication system, each of node terminals communicating with each other converts exterior control data into serial peripheral interface (SPI) data, then converts this data into VPWM data and sends out the converted data to the but line. The node terminal receiving VPWM data from the bus line converts the VPWM data into SPI data and then into data in the original form.

For the connection between the second interface module 7 and the first interface module 6, a connector may be used instead of an undetachable connection means to enable the first interface module 6 to be detachably connected to the second interface module 7. Also, for the connection between the first interface module 6 and the plurality of switches 11-1 to 11-N, a connector may be used instead of an undetachable connection means to enable the switches 11-1 to 11-N to be detachably connected to the first interface module 6.

Figure 2:
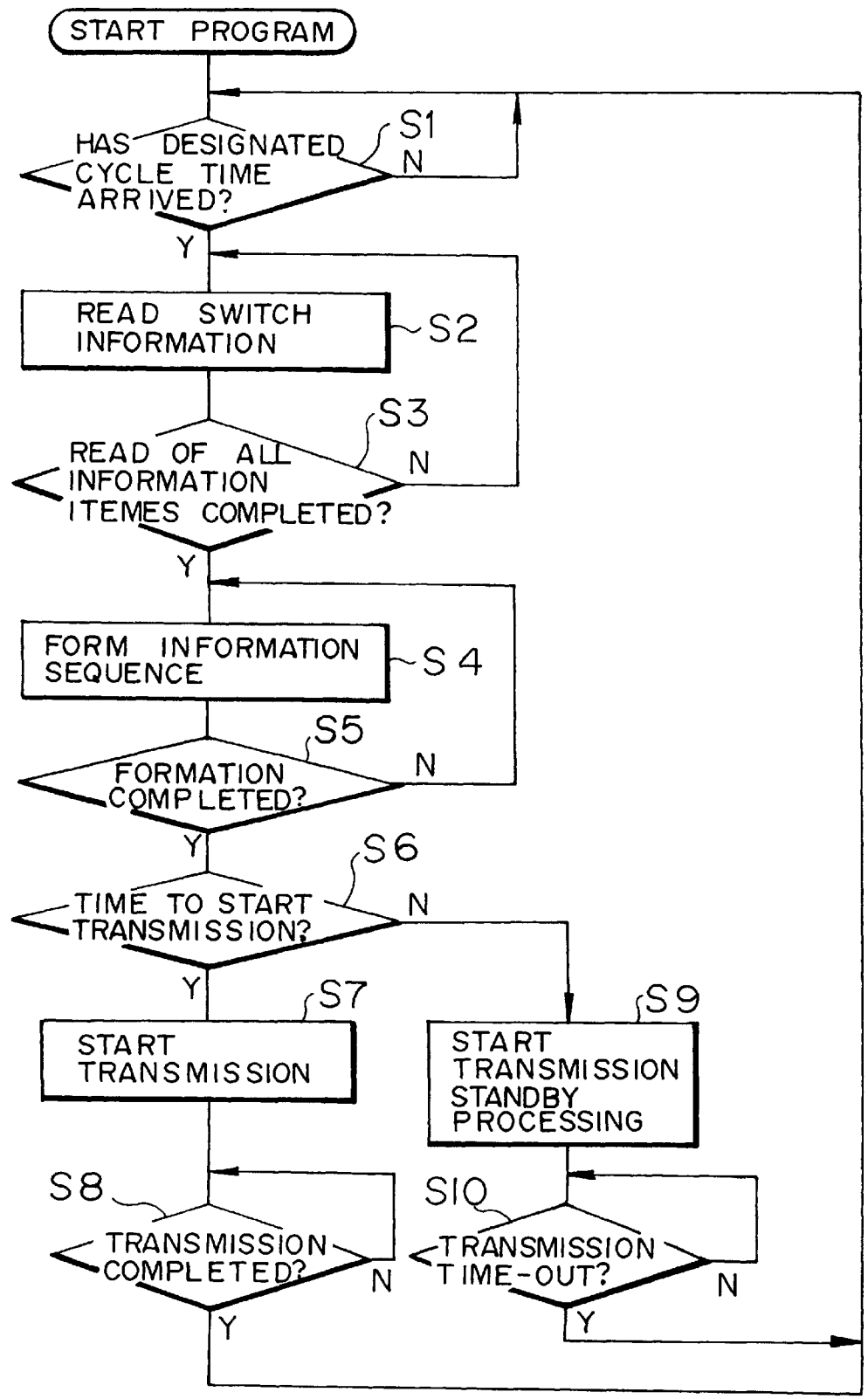
FIG. 2 is a flowchart of switch information collection processing executed by an information collection control unit.
Figure 3:
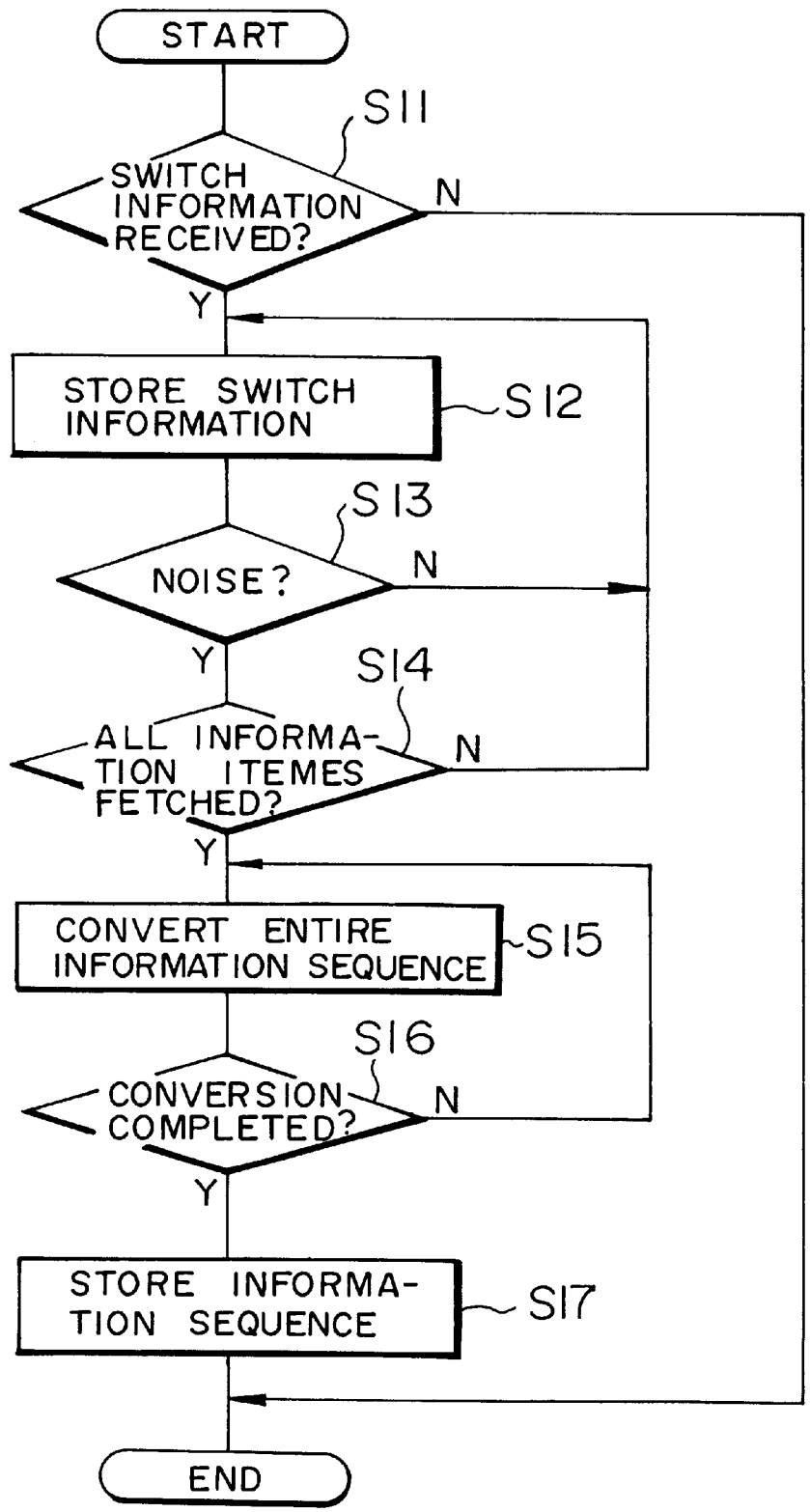
FIG. 3 is a flowchart of switch information collection processing executed by a central control unit.

FIG. 2 is a flowchart of switch information collection processing executed by the information collection control unit 1. FIG. 3 is a flowchart of switch information collection processing executed by the central control unit 2.

The operation of the vehicle multiplex communication apparatus of this embodiment will be described with reference to the flowcharts of FIGS. 2 and 3.

The operation of the information collection control unit 1 will first be described with reference to FIG. 2.

When the program of operating the information collection control unit 1 is started, the first interface module 6 first makes a determination in step S1 as to whether the designated cycle time for collecting switch information has arrived. If it is determined that the designated cycle time has arrived (YES), the process advances to the next step S2. If it is determined that the designated cycle time has not arrived (NO), the processing in step S1 is repeated.

In step S2, the first interface module 6 reads out switch information indicating open/closed states of the plurality of switches 11-1 to 11-N.

In step S3, the first interface module 6 makes a determination as to whether the switch information indicating the switch open/closed state has been read from all the switches 11-1 to 11-N. If it is determined that the switch information indicating the switch open/closed state has been read from all the switches (YES), the process advances to the next step S4. If it is determined that the switch information indicating the switch open/closed state has not been read from all the switches (NO), the process returns to the preceding step S2 to repeat the processing from step S2.

In step S4, the first interface module 6 forms an information sequence (switch information sequence) in accordance with a first information protocol (simpler bus system) on the basis of the read switch information.

In step S5, the first interface module 6 makes a determination as to whether the formation of the information sequence (switch information sequence) in accordance with the first information protocol is finished. If it is determined that the formation of the information sequence (switch information sequence) is finished (YES), the process advances to the next step S6. If it is determined that the formation of the information sequence (switch information sequence) is not finished (NO), the process returns to the preceding step S4 to repeat the processing from step S4.

In step S6, the first interface module 6 makes a determination as to whether a time when the information sequence (switch information sequence) can be transmitted has arrived. If it is determined that a transmission time has arrived (YES), the process advances to the next step S7. If it is determined that no transmission time has arrived (NO), the process moves to step S9.

In step S7, the first interface module 6 transmits the information sequence (switch information sequence) to the second interface module 7.

In step S8, the first interface module 6 makes a determination as to whether the transmission of the information sequence (switch information sequence) to the second interface module 7 has been completed. If it is determined that the transmission of the information sequence (switch information sequence) has been completed (YES), the process returns to step S1 to repeat the processing from step S1. If it is determined that the transmission of the information sequence (switch information sequence) has not been completed (NO), the processing in step S8 is repeated.

In step S9, the first interface module 6 awaits a time for transmitting the information sequence (switch information sequence) in a standby state.

In step S10, the first interface module 6 makes a determination as to whether the time for transmitting the information sequence (switch information sequence) has passed (time-out). If it is determined that the transmission time has passed (YES), the process returns to step S1 to again repeat the processing from step S1. If it is determined that the transmission time has not yet passed (NO), the processing in step S10 is repeated.

The operation of the central control unit 2 will next be described with reference to FIG. 3.

When the program of operating the central control unit 2 is started, the second interface module 7 makes a determination in step S11 as to whether an information sequence (switch information sequence) transmitted via the simpler bus line 8 has been received. If it is determined that an information sequence (switch information sequence) has been received (YES), the process advances to step S12. If it is determined that no information sequence (switch information sequence) has been received (NO), this operation process ends.

In step S12, the second interface module 7 temporarily stores the received information sequence (switch information sequence) in an internal memory.

In step S13, the second interface module 7 makes a determination as to whether the information sequence (switch information sequence) stored in the internal memory consists only of noise. If it is determined that the information sequence consists only of noise (YES), the process returns to the preceding step S12 to repeat the processing from step S12. If it is determined that the information sequence consists not only of noise (NO), the process advances to step S14.

In step S14, the second interface module 7 makes a determination as to whether switch information indicating the switch open/closed state has been read from all the plurality of switches 12-1 to 12-M as well as the received information sequence (switch information sequence). If it is determined that switch information items have been read from all the switches (YES), the process advances to step S15. If it is determined that switch information items have not been read from all the switches (NO), the process returns to the preceding step S12 to repeat the processing from step S12.

In step S15, the second interface module 7 forms a new information sequence (switch information sequence) in accordance with a second information protocol (simpler bus system) on the basis of the received information sequence and all the switch information items (converts the obtained information into a new information sequence).

In step S16, the second interface module 7 makes a determination as to whether the formation of the information sequence (switch information sequence) (conversion) in accordance with the second information protocol is finished. If it is determined that the formation of the new information sequence (switch information sequence) (conversion) is finished (YES), the process advances to the next step S17. If it is determined that the formation of the new information sequence (switch information sequence) (conversion) is not finished (NO), the process returns to the preceding step S15 to repeat the processing from step S15.

In step S17, the second interface module 7 stores the newly formed (converted) information sequence in an internal memory. The operation process ends up with this step.

Thereafter, the new information sequence (switch information sequence) stored in the internal memory is read out by a predetermined timing under the control of the common bus controller 9 to be converted into data in the common bus format. This data is transmitted to the common bus line 3 through the common bus transceiver 10.

The information sequence (switch information sequence) transmitted over the common bus line 3 is supplied to the controlled equipment corresponding to the information sequence (switch information sequence) via other central control units, e.g., the second and third central control units 4 and 5 to perform predetermined controls of the controlled equipment.

Information sequence transmission over the common bus 3 is not only transmission from the central control unit 2 to other central control units, e.g., the second and third central control units 4 and 5 but also transmission from other central control units, e.g., the second and third central control units 4 and 5 to the central control unit 2. Needless to say, information sequences may be transmitted only between other central control units, e.g., the second and third central control units 4 and 5.

The present invention is not limited to the above-described vehicle multiplex communication apparatus. The present invention may be applied in the same manner to communication between audio units mounted in a motor vehicle.

For example, in such a case, the central control unit 2 is arranged as an amplifier with a tuner and a cassette deck, is connected to the common bus 3 and is also connected via the simpler bus 8 to the interface module 6 constituting the information collection control unit 1 while an equalizer, a compact disc (CD) player, a mini disc (MD) player, a CD changer, an MD changer, a digital audio disc (DAD) or digital video disc (DAD) player are connected to the interface module 6.

In the vehicle multiplex communication apparatus arranged as described above as an embodiment of the present invention, if an arbitrary number of additional control elements are provided in a motor vehicle according to a user's need or preference, switch information from the additional control elements is transmitted to the corresponding central control unit via the simpler bus. Therefore, even if the number of additional control elements is arbitrarily selected, the number of signal (input) lines connected to the central control unit can be limited to a number sufficiently smaller than the number of additional control elements, thus avoiding limitation of the number of additional control elements by the capacity of the central control unit.

In the vehicle multiplex communication apparatus according to the embodiment of the present invention, even if the number of additional control elements is arbitrarily selected, additional information output from the additional control elements is entirely encoded into data in the simpler bus format in the information collection control unit. Thus, the problem of a large number of additional information items being simultaneously transmitted over the common bus is solved, thereby preventing a delay of transmission of emergent control information over the common bus.

Further, the specifications of a number of CPUs each used as central control unit 2 can be simplified, so that the manufacturing cost of the apparatus can be reduced. Moreover, a simpler inspection apparatus can be used to check the performances of the component parts.

The multiplex communication apparatus of the present invention has been described with respect to an application to a motor vehicle in which the information collection control unit 1 and the central control unit 2 are disposed in the vicinity of the steering wheel. However, the multiplex communication apparatus of the present invention is not limited to such an application; it can be applied to any other kind of vehicle similar to motor vehicles. Needless to say, the information collection control unit 1 and the central control unit 2 in an application to a different kind of vehicle are placed in a different desirable place in the vehicle.

What is claimed is:

1. A vehicle multiplex communication apparatus comprising:
   a common bus line provided in a vehicle;
   a plurality of central control units connected to said common bus line, each of said central control units transmitting information to and from said common bus line in accordance with a first information protocol;
   at least one of said central control units comprising a first switch element having a plurality of switches; and
   an information collection control unit comprising a second switch element having a plurality of switches and connected with at least one of said central control units through a second bus line;
   said information collection control unit transmitting control information in the form of coded data, said control information being transmitted in one way communication from said second switch element to said central control units and in accordance with a second information protocol different from the first information protocol, said central control unit transmitting control information from said first switch element and said second switch element in accordance with said first information protocol to other central control units, said second information protocol being simpler than said first information protocol.

2. A vehicle multiplex communication apparatus of claim 1, wherein said second switch element comprises at least a portion of operating switches disposed on a motor vehicle steering wheel.

3. A vehicle multiplex communication apparatus of claim 1, wherein said additional control element comprises and element for controlling some of various audio and video units provided on a motor vehicle instrument panel.

4. A vehicle multiplex communication apparatus of claim 1, wherein at least one of the connection between said information collection control unit and said additional control element and the connection between said information collection control unit and said one of said central control units is such that said information collection control unit and said additional control element or said one of said central control units are detachably connected to each other.

5. A vehicle multiplex communication apparatus of claim 3, wherein at least one of the connection between said information collection control unit and said additional control element and the connection between said information collection control unit and said one of said central control units is such that said information collection control unit and said additional control element or said one of said central control units are detachably connected to each other.

* * * * *